Jan. 17, 1956 M. K. ANKLESARIA 2,731,522

TELEPHONE CONTROL DEVICE

Filed Nov. 15, 1954

MANECK K. ANKLESARIA
INVENTOR.

BY Robert C Comstock

Atty.

2,731,522
Patented Jan. 17, 1956

2,731,522

TELEPHONE CONTROL DEVICE

Maneck K. Anklesaria, Los Angeles, Calif.

Application November 15, 1954, Serial No. 468,650

2 Claims. (Cl. 179—178)

This invention relates to a device for controlling the operation of a telephone when the receiver has been removed from the cradle.

In the conventional telephones now in use, a cradle is provided on the top of the base, the cradle comprising two spaced pairs of arms. A pair of spring biased buttons are disposed between each pair of arms. When the handset is not in use, it rests in the cradle, extending longitudinally between the two pairs of arms and being held therebetween. Its weight overcomes the spring biasing of the control buttons and holds them in downward position, flush with the transverse portions of the cradle extending between the arms. When the handset is lifted, the buttons are moved upwardly by the springs to connect the circuit for use of the telephone.

It is an object of my invention to provide a control device which is adapted to depress the buttons without replacement of the handset, thus permitting the handset to remain off the cradle without interfering with the operation of the telephone. My device may also be lifted to permit the buttons to raise when the telephone is used.

It is particularly an object of my invention to provide such a device which is adapted to be used in combination with a telephone handset holding device which holds the handset in an elevated position removed from the cradle. With my device, the handset need not be replaced and its function in controlling the telephone circuit is taken over by my telephone device. In this way the handset can remain off the cradle permanently, being held adjacent the head of the user so that the user has both hands free while using the telephone.

It is a further object of my invention to provide such a device which is simple and economical in construction, which is positive in operation, and which will fit easily and quickly on a conventional telephone set without alteration of the same and without the use of any tools.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my telephone control device in raised position;

Figure 1:
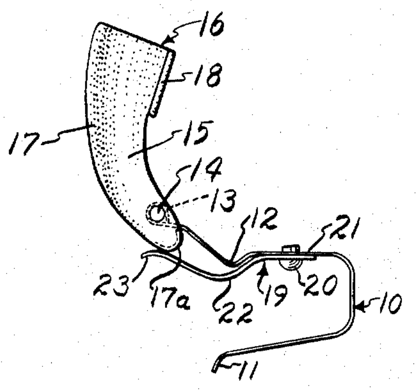
Figure 2:
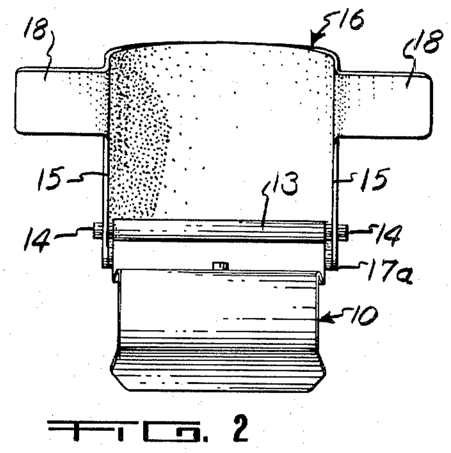
Fig. 2 is a front elevational view of the same.
Figure 3:
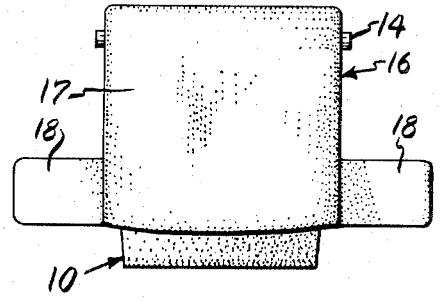
Fig. 3 is a top plan view of my telephone control device in lowered position.
Figure 4:
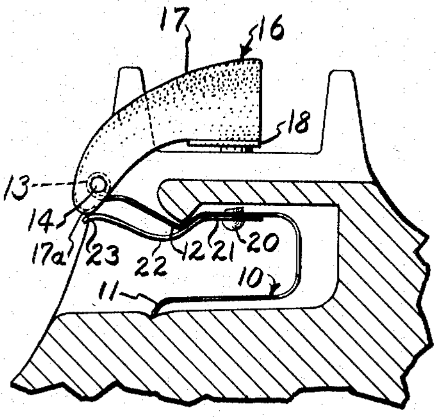
Fig. 4 is a side elevational view of my telephone control device in lowered position in use on a telephone handset, with portions of the handset shown in section.

A preferred embodiment which has been selected to illustrate my invention comprises a substantially U-shaped base 10, which is preferably formed from a single piece of flat spring steel. The bottom of base 10 is provided at its end with a downwardly extending lip, which extends across the entire end. The top of base 10 is provided with a downwardly extending groove 12, which extends across its entire width and which is disposed above lip 11. The top of base 10 is turned back on itself at the end to form a cylindrical tube 13.

Extending through tube 13 is an elongated shaft 14, which is rotatably mounted at its opposite ends in a pair of openings adjacent one end of the opposite side walls 15 of a control member 16. Control member 16 is provided with a longitudinally convex top 17, which extends between side walls 15 and which is preferably integral therewith. Extending outwardly from the bottom of side walls 15 adjacent the front of control member 16 are a pair of integral elongated flanges 18. At the rear of control member 16, the top 17 is bent back to provide a semi-circular portion **17*a* adjacent tube 13 of base 10**.

A spring clip 19 which is slightly narrower in width than base 10 is attached at one end to the undersurface of the top part of base 10 by a rivet 20 or other suitable fastening means. Spring clip 19 is provided with a flat portion 21 which is flush with and attached to base 10, an arcuate portion 22 which flares outwardly around and beneath groove 12 and a reversely curved arcuate lip 23 at its outer end.

In use, the closed end of U-shaped base 10 is inserted into the hollow space which is provided behind and beneath the cradle of a conventional telephone. It is inserted until lip 11 fits into a groove which extends laterally across the bottom of the hollow space and groove 12 engages a downwardly extending ridge which extends laterally across the top rear edge of the portion of the telephone which defines the top of a hollow space. Since base 10 is formed of resilient material, it holds lip 11 and groove 12 in place by outwardly directed resilient pressure.

When base 10 is so mounted, control member 16 extends forwardly over the space between the arms of the telephone cradle. When control member 16 is in downward position, flanges 18 extend over the control buttons of the telephone and hold them in depressed position so that the telephone circuit is disconnected.

Upward pressure exerted on the top 17 of control member 16 will cause control member 16 to pivot upwardly on shaft 14. When this occurs, the semi-circular portion **17*a* at the end of top 17 engages the arcuate lip 23 of spring clip 19. This engagement provides spring tension which resists the upward movement of control member 16** and which prevents any accidental upward displacement thereof.

As the spring tension of arcuate lip 23 is overcome, semi-circular portion **17*a* moves across the center of arcuate lip 23 and toward the bottom of the adjacent arcuate portion 22 of spring clip 19. It thus passes into a position in which spring clip 19** tends to maintain it in upward position. In such position, the buttons of the telephone are permitted to move upwardly and the telephone circuit is connected.

The end of semi-circular portion **17*a* engages the undersurface of the top portion of base 10 adjacent tube 13 to provide a stop which prevents further upward movement of control member 16**.

When pressure is exerted on top 17 to move it downwardly or forwardly, its movement is at first resisted by arcuate lip 23 of spring clip 19 until semi-circular portion **17*a* passes over its center. Thereafter arcuate lip 23 and spring clip 19 act to move control member 16 downwardly so that flanges 18** again depress the buttons of the telephone handset.

My control device thus provides complete control of the telephone circuit, with the device automatically remaining in on or off position. It is thus possible to remove the handset from the cradle permanently without interfering with the operation of the telephone. This permits the handset to be mounted elsewhere where it is more convenient for the user.

I claim:

1. A telephone control device comprising a substantially U-shaped spring steel base, said base having a lateral groove extending downwardly across the top thereof, the bottom of said base having a transverse lip extending downwardly at the end thereof, the end of the top of said base being bent back upon itself to form a tube, a rod extending through said tube, a control member having a pair of side walls with aligned openings therein, the ends of said rod being pivotally mounted in said openings, said control member having a pair of integral flanges extending outwardly from the bottom of said side walls adjacent the opposite end of said walls from said openings, the end of said control member adjacent said openings being bent back upon itself to provide a semi-circular portion extending transversely across the end of said control member, a spring clip attached to the inside of the top of said base, said spring clip having an arcuate portion disposed beneath the groove in the top of said base, the end of said spring clip being provided with a reversely curved lip, said lip extending upwardly from said groove and then downwardly adjacent the end of said spring clip, the end of said spring clip being disposed directly beneath the semi-circular portion at the end of said control member, said control member adapted to be manually pivoted on said rod with respect to said base, with said semi-circular portion engaging one side or the other of said lip to hold said control member in raised or lowered position.

2. The subject matter of claim 1, said base adapted to be mounted in the opening of a telephone handset between and beneath the control buttons thereof, with the lip on the bottom of said base extending into a groove in the bottom of the handset opening and the groove in the top of said base receiving a downwardly extending flange in the top of the handset opening, said base being held in position by its spring tension, the flanges of said control member extending above the control buttons of the handset to exert downward pressure upon and hold the same in depressed position or to release such pressure and permit said buttons to move upwardly, depending upon the positioning of said control member, said control member being manually movable to upward or downward position to control the opening and closing of the telephone circuit.

References Cited in the file of this patent

UNITED STATES PATENTS

| | | |
|---|---|---|
| 2,558,661 | Murray | June 26, 1951 |
| 2,647,959 | Mahoney | Aug. 4, 1953 |